(12) United States Patent
Kojima et al.

(10) Patent No.: US 6,220,214 B1
(45) Date of Patent: Apr. 24, 2001

(54) CYLINDER LINER FORMED WITH CROSS-HATCHING GROOVES

(75) Inventors: Genshin Kojima; Fujio Anzai; Munehiko Doi, all of Tochigi-ken (JP)

(73) Assignee: Nippon Piston Ring Co., Ltd., Saitama-Ken (JP)

(*) Notice: Subject to any disclaimer, the term of this patent is extended or adjusted under 35 U.S.C. 154(b) by 0 days.

(21) Appl. No.: 09/537,677

(22) Filed: Mar. 29, 2000

(30) Foreign Application Priority Data

Mar. 31, 1999 (JP) .................................................. 11-091156

(51) Int. Cl.[7] .............................. F02F 1/00; B24B 33/02
(52) U.S. Cl. ............................................................ 123/193.2
(58) Field of Search .............................. 123/193.2, 193.3; 29/888.061; 92/223

(56) References Cited

U.S. PATENT DOCUMENTS 5,560,283 * 10/1996 Hannig ................................... 92/223
6,158,407 * 12/2000 Mizutani ........................... 123/193.2

FOREIGN PATENT DOCUMENTS 7-54706    2/1995  (JP) .

* cited by examiner

*Primary Examiner*—Marguerite McMahon
(74) *Attorney, Agent, or Firm*—Sughrue, Mion, Zinn, Macpeak & Seas, PLLC

(57) ABSTRACT

A cylinder liner formed of a cast iron and having an inner peripheral surface subjected to honing which forms cross-hatching grooves on the surface. A resultant surface roughness ranges from 0.4 $\mu mR_{3Z}$ to 0.8 $\mu mR_{3Z}$, and an open phase rate of graphite is not less than 80% at the inner peripheral surface.

4 Claims, 5 Drawing Sheets

CYLINDER LINER FORMED WITH CROSS-HATCHING GROOVES

BACKGROUND OF THE INVENTION

The present invention relates to a cylinder liner, and more particularly, to a type thereof fitted in a cylinder wall of a cylinder block.

Conventionally, a cylinder block is formed of an aluminum alloy and a cylinder liner formed of cast iron is fitted in the cylinder block in order to reduce overall weight and to improve thermal conductivity of an automobile engine. An inner peripheral surface of the cylinder liner is subjected to honing in order to exhibit lubrication oil controllability and an initial break-in property.

For the honing process, a honing tool having a honing head 5 is employed as shown in FIG. 6. The honing head 5 has a body 6 in which a push rod 7 provided integrally with a taper cone 8 is disposed movably in an axial direction of the body 6. An elongated grindstone or a hone 10 extending in an axial direction of the body 6 is fixed to a stone holder 9 provided at an outer peripheral surface of the body 6. Several parts of the stone holder 9 radially inwardly protrude toward an axis of the body 6, and a tapered surface 9a in mating relation to the taper cone 8 is formed at each inner end of the protruding part.

If the push rod 7 is moved downwardly by a hydraulic drive means (not shown), the stone holder 9 is moved radially outwardly by the taper cone 8, so that the grindstone 10 is pressed onto a surface of a workpiece 1, i.e., an inner peripheral surface 4 of the cylinder liner. The body 6 is connected to a drive motor (not shown) for rotating motion and to a hydraulic device (not shown) for reciprocating motion. Thus, the honing head 5 is reciprocatingly movable in a direction indicated by an arrow Va, while the honing head 5 is rotated in a direction indicated by an arrow Vr. Thus, honing is imparted on the inner surface 4 of the workpiece 1.

As a result of the honing, cross-hatching grooves "A" having a predetermined cross-hatching angle and surface roughness are formed in the inner surface 4 of the workpiece 1. A portion sectioned by the cross-hatching grooves is referred to as a plateau. A desired function of the cylinder liner such as the above-mentioned oil controllability and initial break-in property is provided by the cross-hatching grooves. Thus, the cylinder liner can provide a sufficient scuffing resistance.

In order to improve scuffing resistance, a typical grindstone for honing is GC800K or a low hardness grindstone formed of a resin or a cork. The roughness attendant to the cross-hatching is relatively large such as from 0.8 to 2.0 $\mu m R_{3Z}$ even in case of the plateau honing. Incidentally, $R_{3Z}$ implies surface roughness measurement amount. In case of a mean surface roughness $R_Z$ defined in DIN4768, a test piece is subdivided into five individual cross-sections, and a distance between the highest peak and the deepest score with respect to each cross-section is obtained to obtain a mean value. On the other hand, $R_{3Z}$ implies a functional surface roughness in which 2 outliers in the top and bottom ranges are not taken into consideration in each of the 5 individual sections. Incidentally GC800K is defined in JIS R6211-1980 or ISO 525. "GC" implies material of grindstone particle, i.e., silicon carbide, "800" implies particle size, i.e., extremely fine, and "K" implies binding force of a binder for binding together the grindstone particles.

SUMMARY OF THE INVENTION

FIG. 7 shows a graphical representation showing the relationship between the surface roughness attendant to the cross-hatching grooves and lubrication oil consumption amount. As is apparent from the graph, oil consumption amount increases in accordance with an increase in roughness. If the roughness decreases, the oil consumption amount is deemed to be decreased.

According to a conventional cylinder liner, since the surface roughness is relatively large such as from 0.8 to 2.0 $\mu m R_{3Z}$, greater oil consumption amount resulted. An attempt was made to lower the surface roughness of the cylinder liner to not more than 0.8 $\mu m R_{3Z}$ in order to reduce the oil consumption amount. However, honing performance is insufficient, and "plastic flows" may occur in an inner peripheral surface of the cylinder liner if fine surface roughness is desired. The plastic flows may plug or close an opening of graphite existing or exposing at the inner peripheral surface of the cylinder liner. The graphite opening inherently provides oil retaining property. However, due to the plugging, this property may be lowered. Further, due to excessive honing, "open phase rate of graphite" may be low. This rate is the rate of the non-damaged graphite precipitated at the inner peripheral surface of the cylinder liner, the graphite being not damaged by the honing. Due to the lowering of the rate, a supplemental lubrication property because of the self-lubricating characteristic of the graphite cannot be performed, and therefore, scuffing may easily occur if an oil film is not uniformly provided or disappears in the inner surface of the cylinder liner.

It is therefore an object of the present invention to provide a cylinder liner providing high scuffing resistance yet providing a low oil consumption efficiency.

This and other objects of the present invention will be attained by providing a cylinder liner fixed to a cylinder bore and in relative sliding contact with a piston, the liner having an inner peripheral surface whose surface roughness ranges from 0.4 $\mu m R_{3Z}$ to 0.8 $\mu m R_{3Z}$. Graphite is precipitated on the surface, and an open phase rate of graphite is not less than 80%.

BRIEF DESCRIPTION OF THE DRAWINGS

In the drawings:

FIG. 1(*b*) is a graphical representation showing surface roughness $R_{3z}$ with respect to the test piece of FIG. 1(*a*);

FIG. 2(*b*) is a graphical representation showing surface roughness $R_{3z}$ with respect to the test piece of FIG. 2(*a*);

DETAILED DESCRIPTION OF THE PREFERRED EMBODIMENTS

Figure 1:
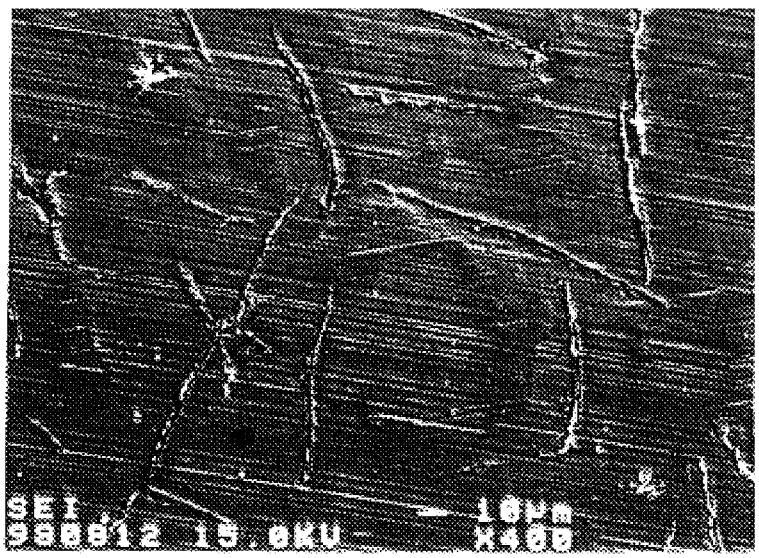
FIG. 1(*a*) is a microscopic photograph showing a surface of a test piece provided by a honing which provides a cylinder liner according to a first embodiment of the present invention.
Figure 2:
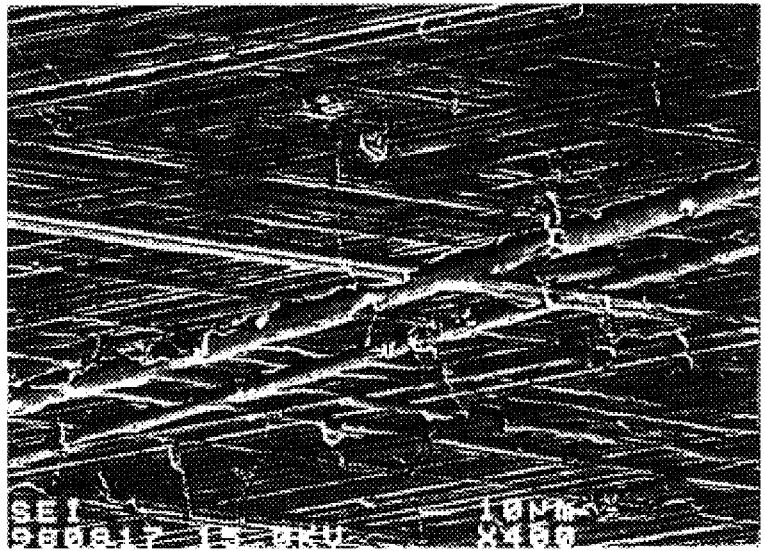
FIG. 2(*a*) is a microscopic photograph showing a surface of a test piece provided by another honing which provides a conventional cylinder liner.
Figure 1:
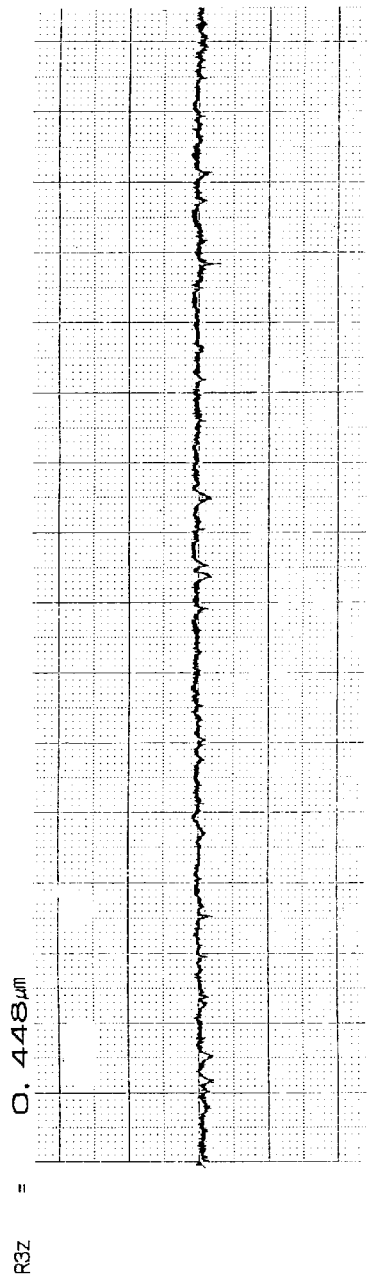
Figure 2:
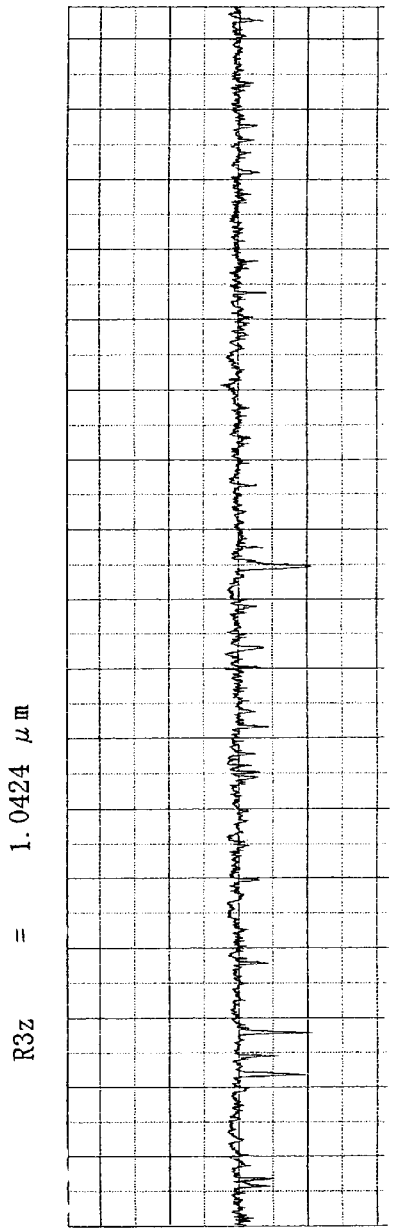

A cylinder liner according to a first embodiment of the present invention will be described with reference to FIGS. 1 through 4. The cylinder liner is made of a cast iron such as a gray cast iron (defined in JIS G5501).

A fibrous elastic finishing grindstone is used as a finishing grindstone for honing process performed to produce the cylinder liner. This grindstone has a roughness equivalent to a grindstone of GC3000L (defined in JIS R6211-1980 or ISO 525), or a mixture of GC3000L and AES2000 (product of Nippon Tokushu Kento Kabushiki Kaisha). By the employment of the fibrous elastic finishing grindstone, a honing of extremely minute finishing is attained while restraining plastic flow of the grounded material at the honed surface.

Experiments were performed to investigate advantages of the cylinder liner provided by the honing. As test pieces, two cylinder liners formed of cast iron were prepared, and one cylinder liner was subjected to the honing according to the first embodiment, and the other cylinder liner was subjected to a conventional honing using the conventional GC800K. FIGS. 1(a) and 2(a) are microscopic photographs showing surfaces of the test pieces of the first embodiment, and the conventional cylinder liner, respectively.

As shown in FIG. 2(a), relatively coarse cross-hatching were formed in the surface of the cylinder liner subjected to the conventional honing. Further, a graph in FIG. 2(b) indicates variation in roughness over an entire surface, and the mean surface roughness value was relatively high such as about 1 $\mu mR_{3Z}$.

On the other hand, as shown in FIG. 1(a), extremely fine cross-hatching were formed in the surface of the cylinder liner subjected to the honing according to the first embodiment. Further, a graph in FIG. 1(b) indicates less variation in surface roughness over an entire surface, and the mean surface roughness value was relatively low such as about 0.4 $\mu mR_{3Z}$. Moreover, in the photograph of FIG. 1(a), a black colored band-like area, which is not acknowledged in the photograph of FIG. 2(a), can be seen over the cross-hatching region. This black colored area indicates an open phase of graphite, which is advantageous in performing a supplemental lubricating function because of a self-lubricating characteristic of the graphite.

Next, a face-to-face scuffing tests were performed on the test pieces. In this test, a test piece held at a position is pressed onto an opponent sliding member rotated at a constant rotation speed for a predetermined period. The pressure applied to the test piece is gradually increased, and a pressure at which scuffing occurs is measured. For example, an initial pressure of 10 kg/cm$^2$ is applied to the test piece, and the pressure is intermittently increased by 5 kg/cm$^2$ every 5 minutes. The test piece according to the first embodiment provided an open phase rate of graphite of 80%, and has a surface roughness of 1 $\mu$m, whereas another test piece according to the conventional cylinder liner provided the open phase rate of 20% and has the same surface roughness of 1 $\mu$m. The object of the test is to investigate the relationship between the open phase rate of graphite and the scuffing resistance., even though the surface roughness of 1 $\mu$m is not in accordance with the first embodiment. An opponent sliding member was Cr-plated member.

Figure 3:
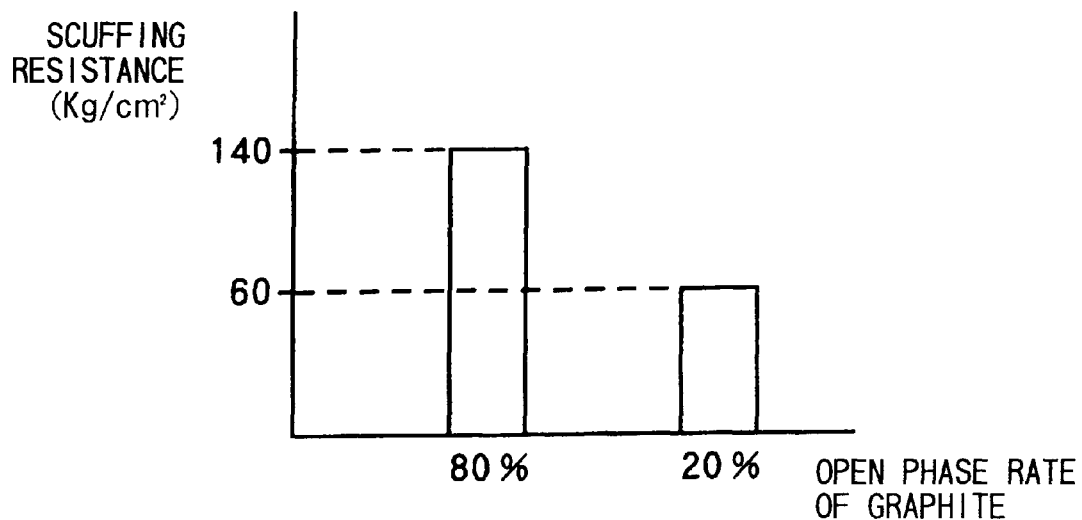
FIG. 3 is a graphical representation showing the relationship between a scuffing resistance and an open phase rate of graphite at a surface of a test piece subjected to honing which forms a cylinder liner according to the first embodiment of the present invention.

As is apparent from the graph shown in FIG. 3, the cylinder liner having the open phase rate of graphite higher than that of the conventional cylinder liner provided higher scuffing resistance, see the scuffing resistance of 140 kg/cm$^2$ v. s. 60 kg/cm$^2$ in FIG. 3.

Figure 4:
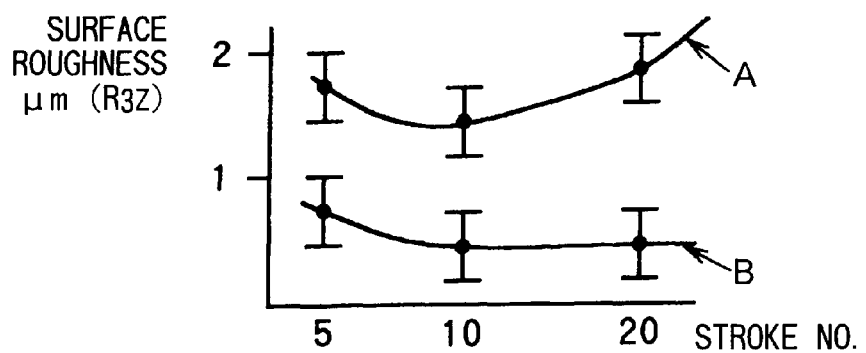
FIG. 4 is a graphical representation showing the relationship between stroke numbers of honing process and a surface roughness of a surface of a test piece subjected to the honing which forms a cylinder liner according to the first embodiment of the present invention.

Next, experiment was made to investigate the relationship between the surface roughness and stroke numbers of the grindstone. That is, the grindstone was reciprocatingly moved by the predetermined numbers of stroke with respect to the inner surface of the cylinder liner while being rotated in the cylinder liner. The test pieces were the same as those used in the face-to-face scuffing tests. In FIG. 4, a curve A is data of the conventional cylinder liner, and a curve B is data of the cylinder liner of the first embodiment. As is apparent from the graph shown in FIG. 4, with respect to the cylinder liner imparted with the conventional honing, the surface roughness is lowered if the stroke numbers were increased from 5 times to 10 times. However, the surface becomes coarse if the stroke numbers were increased to more than 10 times. On the other hand, with respect to the cylinder liner imparted with the honing according to the first embodiment, the surface roughness is lowered if the stroke numbers were increased from 5 times to 10 times, similar to the conventional cylinder liner. Further, the roughness was not changed but was constantly maintained even if the stroke numbers were increased to more than 10 times. Therefore, in the honing according to the first embodiment, it is unnecessary to accurately define an adequate stroke numbers, but is merely necessary to provide an increased stroke numbers in an attempt to obtain a desired surface roughness.

In view of the foregoing, with the honing in accordance with the first embodiment of the present invention, fine surface roughness and high open phase rate of graphite at the inner peripheral surface of the cylinder liner can be obtained. Thus, the cylinder liner according to the first embodiment provides low lubrication oil consumption and high scuffing resistance.

Figure 5:
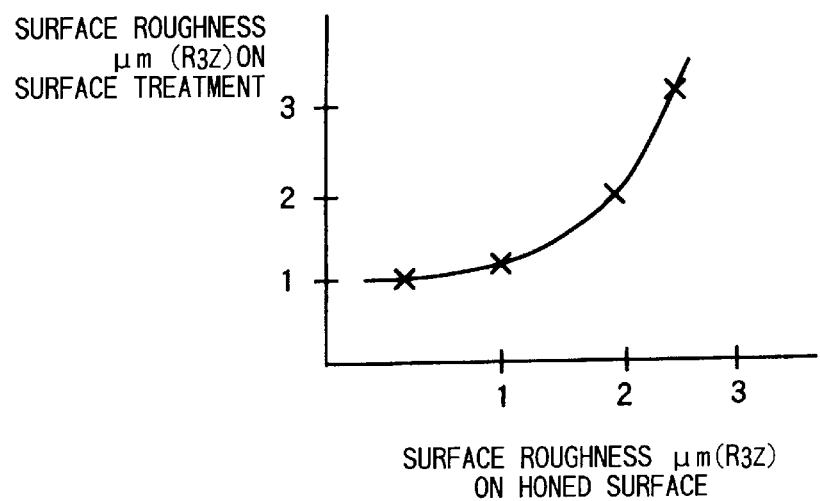
FIG. 5 is a graphical representation showing the relationship between a surface roughness after a surface treatment is performed on a honed surface according to a second embodiment of the present invention and a surface roughness on the honed surface without any surface treatment.
Figure 6:
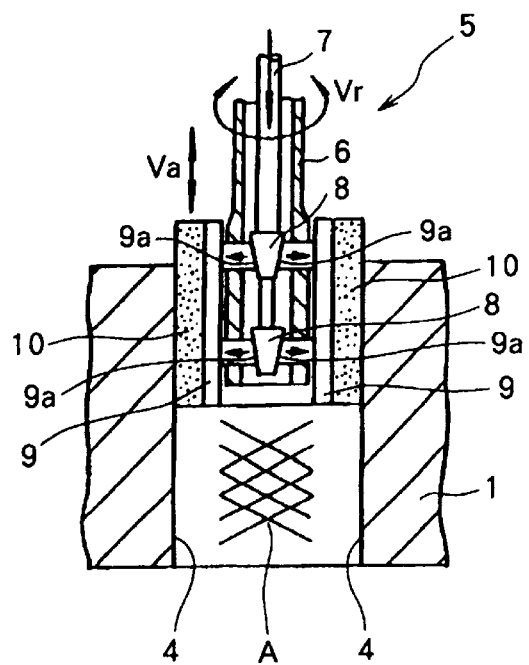
FIG. 6 is a schematic cross-sectional view showing a conventional honing head for performing a honing to an inner peripheral surface of a cylinder liner.
Figure 7:
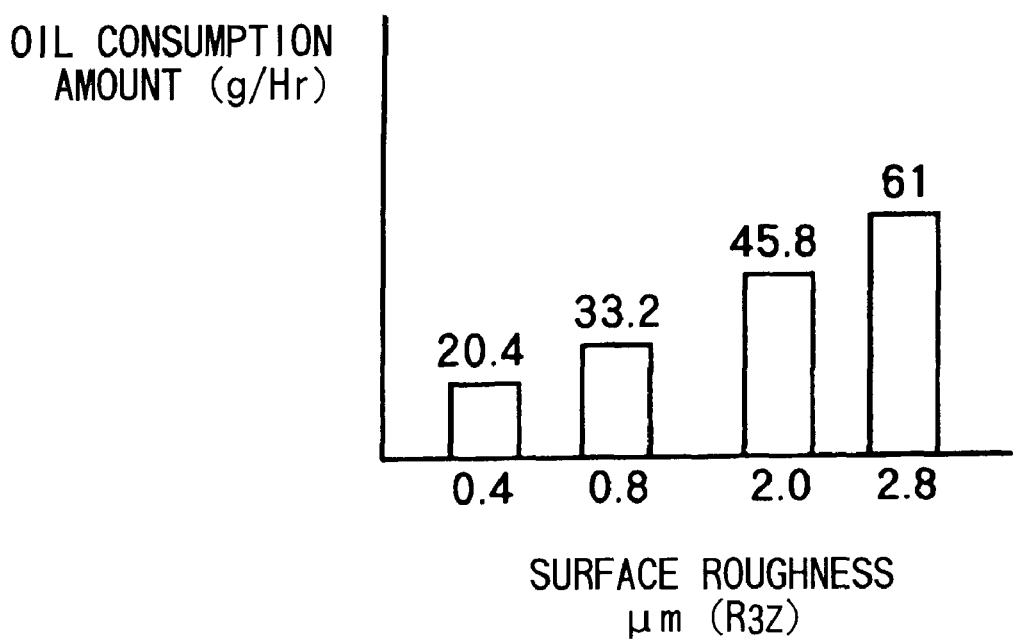
FIG. 7 is a graphical representation showing the relationship between a surface roughness of a conventional cylinder liner and a lubrication oil consumption amount.

A cylinder liner according to a second embodiment of the present invention will be described with reference to FIG. 5. In the second embodiment, fine surface roughness is provisionally formed in the inner surface of the cylinder liner in accordance with the above-described honing. Then, a surface treatment is performed on the inner surface by forming a forming layer on the inner surface. The forming layer is formed by lubrite treatment (phosphate treatment or phosphating) or a nitriding treatment. FIG. 5 shows the relationship between a surface roughness after the surface treatment is performed on a honed surface and a surface roughness on the honed surface without any surface treatment. As is apparent from the graphs shown in FIG. 5, the finer that the surface is honed, the smoother the surface will be after surface treatment. Therefore, if the surface roughness after the surface treatment is to be small, the fine honed surface should be provided.

While the invention has been described in detail and with reference to the specific embodiments thereof, it would be apparent to those skilled in the art that various changes and modifications may be made therein without departing from the spirit and scope of the invention.

What is claimed is:
1. A cylinder liner fixed to a cylinder bore and in relative sliding contact with a piston, comprising:
an inner peripheral surface having a surface roughness ranging from 0.4 $\mu mR_{3Z}$ to 0.8 $\mu mR_{3Z}$ and an open phase rate of graphite of not less than 80%.

2. The cylinder liner as claimed in claim 1, wherein the cylinder liner is formed of a cast iron and the inner peripheral surface is formed with cross-hatching grooves by a honing.

3. The cylinder liner as claimed in claim 2, wherein the honing employs a fibrous elastic finishing grindstone.

4. The cylinder liner as claimed in claim 1, further comprising a surface treated layer formed on the inner peripheral surface.

* * * * *